July 29, 1947. W. P. BOOTHROYD 2,424,735
HUMIDITY CONTROL APPARATUS
Filed Jan. 27, 1945 2 Sheets-Sheet 1

INVENTOR.
WILSON P. BOOTHROYD
BY HIS AGENT
Carl H. Synnestvedt

July 29, 1947.  W. P. BOOTHROYD  2,424,735
HUMIDITY CONTROL APPARATUS
Filed Jan. 27, 1945  2 Sheets-Sheet 2
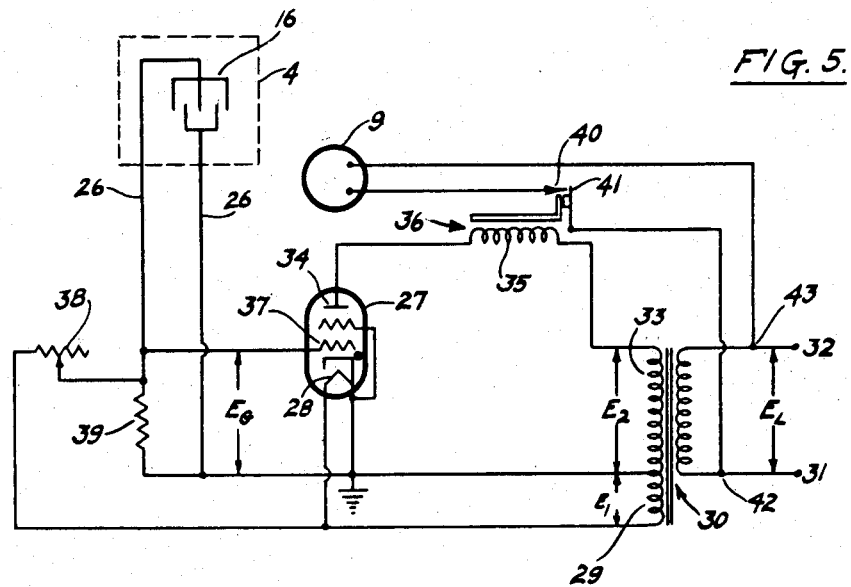
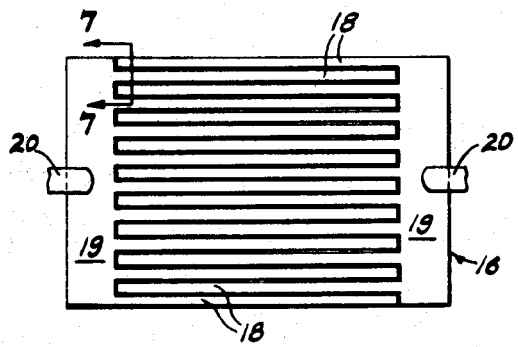
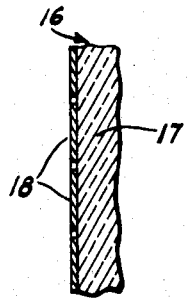
INVENTOR.
WILSON P. BOOTHROYD
BY HIS AGENT
Carl H. Synnestvedt Patented July 29, 1947

2,424,735

UNITED STATES PATENT OFFICE 2,424,735

HUMIDITY CONTROL APPARATUS

Wilson P. Boothroyd, Philadelphia, Pa., assignor, by mesne assignments, to Philco Corporation, Philadelphia, Pa., a corporation of Pennsylvania Application January 27, 1945, Serial No. 574,951

4 Claims. (Cl. 236—44)

This invention relates to a method and apparatus for moisture detection and control.

More particularly, the present invention, while not limited thereto, is especially concerned with a novel method of and means for controlling the humidity or moisture content of air within the food storage compartment of a refrigerator.

With relation to the application of my invention to refrigerators, it should be borne in mind that it has proven desirable to provide a so-called moist-cold compartment maintained at a relative humidity value sufficiently high properly to preserve foodstuffs without dehydration. However, in refrigerators embodying such high humidity compartments, it has proven difficult to insure the desired degree of compartment humidity throughout the various seasons of the year, while still preventing the humidity from reaching undesirably high values at certain times. This difficulty may arise under many operating conditions, but is particularly troublesome in damp climates. As is well known, excessive humidity results in undesirable condensation of moisture upon the walls of the compartment. The reason for this will be apparent when it is understood that it has become common to effect cooling of the moist-cold compartment through its walls and, as a consequence, such walls frequently assume temperature values below the dew-point temperature of the compartment air, when the relative humidity in the compartment has reached the undesirably high values mentioned above.

Refrigerators have been developed which incorporate means for removing moisture in excess of a predetermined value of percent relative humidity to prevent the aforesaid undesirable condensation of moisture upon the walls. By way of example, such a refrigerator is disclosed and claimed in the copending application of John J. Bauman, Serial No. 565,435, filed November 28, 1944, and to which further reference is made hereinafter.

A primary object of the present invention is to provide improved humidity detection and control apparatus.

More particularly, the present invention has as an object the provision of a refrigerator of the aforesaid type, having apparatus capable of limiting the maximum relative humidity value of the compartment air to an amount well below 100%, if such should be desired.

It is also an object of my invention to provide an improved method of controlling the vapor content of a gas within an enclosure.

Still further, the present invention contemplates the provision of apparatus operable to maintain the relative humidity of an enclosed space at any desired predetermined value within a relatively wide range of selection. To this general end, my invention employs an electrical resistance element (the resistance of which is a function of moisture deposited thereon) in novel combination with a voltage-responsive system providing extremely sensitive and flexible control of the operation of moisture varying means.

The invention extends further to certain novel constructional features and arrangements hereinafter described and illustrated in the attached drawings, in which:

Fig. 5 is a circuit diagram of the humidity control apparatus of the present invention;

Fig. 6 is a face view, on an enlarged scale, of the resistance element illustrated in Fig. 2; and Fig. 7 is a fragmentary sectional view, on a greatly enlarged scale, taken along the line 7—7 of Fig. 6.

For the purpose of illustration, the present invention is shown and described as applied to a refrigerator of the character disclosed and claimed in the aforementioned Bauman application, but it is to be understood that the invention is not only applicable to other refrigerating and air conditioning devices but, in the broader aspect, has utility in the general field of hygrometry.

Figure 1:
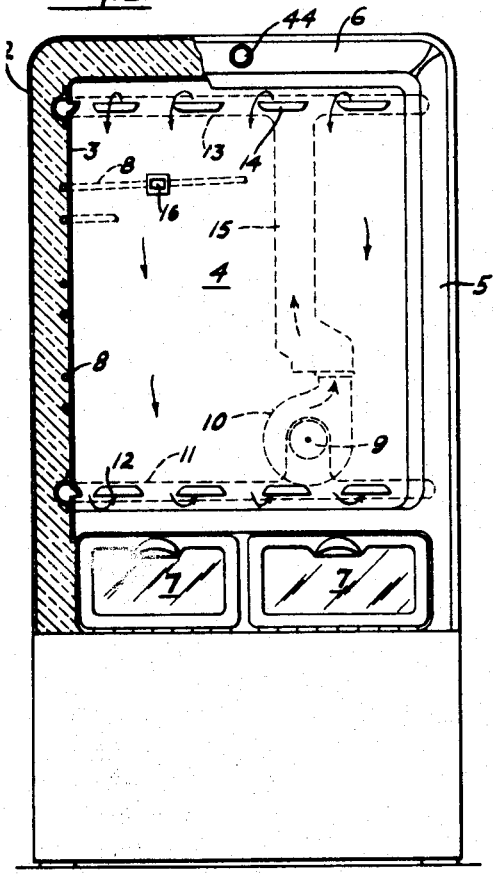
Fig. 1 is an elevational view of a refrigerator embodying the invention, portions thereof being broken away to facilitate illustration.

Referring to Fig. 1, there is shown a refrigerator which includes an outer shell 2 and an inner shell or liner member 3 defining a moist-cold food storage compartment 4, which compartment may be fitted with a plurality of shelves, of any desired type. The cabinet would, of course, be provided with a door (not shown) said door being adapted to seat thereagainst in the plane defined by vertical and horizontal breaker-strips 5 and 6.

In the embodiment illustrated, the refrigerator further includes ice-freezing and low-temperature storage compartments to which access may be had through doors shown at 7—7. It will be understood that the compartment 4 is thermally isolated from the lower temperature storage sections, in order that it may be possible to operate compartment 4 at relatively high temperatures, as compared with the temperature of said sections, and to prevent the undesired frosting-out of moisture present in said compartment 4.

Although any convenient form of refrigerant circuits may be employed, there is illustrated an arrangement in which the main compartment 4 is cooled by means of refrigerant tubing 8 secured in convoluted arrangement about the exterior surface of the inner liner and constituting the evaporator portion of a secondary refrigerant circuit of known type. While detailed description of the refrigerant circuits is not necessary herein, since the present invention is not concerned therewith, it may be mentioned that condensation of the secondary liquid in the tubing 8 is preferably effected by means of heat exchange association between a portion of said tubing and a portion of a lower temperature primary evaporator associated with the relatively low temperature storage compartments aforesaid. Also, constant pressure valves are commonly used to stabilize the temperature of the secondary.

It should be borne in mind that, in common with the aforementioned Bauman application, the invention is concerned with an arrangement in which undesired humidity in the main food storage compartment is eliminated by effecting periodic circulation of the compartment air through certain ducts associated with said compartment, and thence through a passage or zone arranged in heat exchange relation with a normally cold element. In such a system, there is a transfer of latent heat from the moisture-laden air to the cold element referred to and, consequently, some of the moisture is condensed from the air and deposited in the dehumidifying zone. Following this, the air, whose absolute humidity has now been substantially decreased, is reinjected into the food storage compartment and, combining with the air in said compartment, acts to lower the overall relative humidity therein.

In the apparatus illustrated, this air circulation is effected, as and when required, by means of a motor 9 and an associated blower indicated at 10, operable periodically in response to the humidity conditions existing in the compartment 4, as will be set forth in detail hereinafter. A generally C-shaped air-withdrawal duct 11 extends about the side and rear walls of the liner 3, in the lower portion thereof, and, as shown at 12, apertures are provided in the liner wall in registry with this duct. A similar air injection duct 13 extends about the upper portion of the liner member, the liner wall again being provided with a plurality of apertures 14 to permit passage of air from said duct 13 and reinjection into the food compartment 4. Extending between the withdrawal and injection passages 11 and 13 is a vertically extending dehumidifying passage 15 and, as designated by arrows appearing in the drawings, it will be apparent that the air is withdrawn from the compartment through duct 11, passes upwardly into the inflow portion of the blower unit 10 and thence upwardly through passage 15. The circuit is, of course, completed by reinjecting the air into compartment 4 through apertures 14. It is in passage 15 that a transfer of latent heat occurs and the condensation of excess moisture takes place. If desired, reference may be had to the Bauman disclosure for a more detailed description of the particular moisture removing system, but it may be noted that, in accordance with said disclosure, a portion of the primary suction line is arranged within passage 15, which portion attains relatively low temperatures during the refrigerating cycle. However, for the purposes of the present invention, moisture removal may be accomplished by other known means.

As will become apparent in what follows, it is important that the walls of the liner 3 be maintained at a relatively constant above-freezing temperature value, for example in the neighborhood of 38° F. It is well known in this art, that such may be readily accomplished by the design and inter-relation of a secondary system (8) and an associated primary system (not shown). Experience has demonstrated that maintenance of the 38° temperature at the liner walls will result in about a 40° F. average temperature within the compartment 4.

As thus far described, the illustrated structure corresponds substantially to that shown in the aforementioned Bauman disclosure. In particular accordance with the present invention, a novel control arrangement and apparatus is provided to initiate and control the operation of the motor 9 and its associated blower so as to effect the above described humidity-lowering operation. As mentioned at the outset, this invention employs an electrical resistance element located within the compartment 4 (the resistance of which is a function of moisture deposited thereon) in novel combination with a voltage-responsive system providing an unusually high degree of sensitivity and flexibility in the control of the operation of the moisture removing means. This system will now be described in detail.

As appears at 16 in Fig. 1, the resistance element is located upon the inside surface of the inner liner 3, preferably in close proximity to one run of the tubing 8, in order to maintain said element at a substantially constant temperature (and therefore at a substantially constant range of resistance values) which temperature is a little lower than the average temperature prevailing within the compartment. This resistance element will be hereinafter referred to as a humigrid, and the use of this term in the following description should be understood to denote an electrical resistance element whose resistance varies with an increase in the amount of moisture deposited thereon.

As clearly appears in Figs. 6 and 7, the humigrid comprises a relatively thin dielectric base 17, preferably of glass, having parallel spaced platinum ribbons 18, fused thereon. This construction is best seen by reference to Fig. 7. Alternate ribbons terminate in common conducting zones 19—19, which also serve as contact areas for electrical connecting spring fingers 20. A humigrid comprising a glass base approximately 1 inch by 1½ inches, and having 18 parallel ribbons .002 inch thick and spaced .015 inch apart, has been found to give good results.

Figure 2:
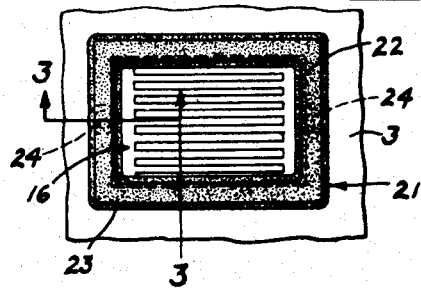
Fig. 2 is a fragmentary elevational view showing the humidity-responsive resistance element applied to the refrigerator wall.
Figure 3:
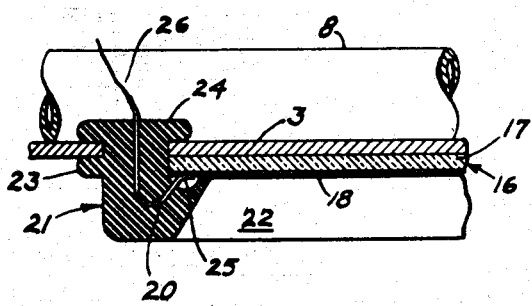
Fig. 3 is an enlarged sectional view taken along the line 3—3 of Fig. 2.

The glass base 17 is mounted in high heat transfer relation with the wall of inner liner 3, in a manner which will be evident from a consideration of Figs. 2 and 3. A frame 21, of rubber or other suitable insulating material, surrounds the humigrid, said frame having an inner peripheral lip portion 22 which is adapted to fit snugly about the edge portions of the humigrid to support the same, and serves to exclude dirt and moisture from the contact areas 19.

An outwardly extending peripheral bead 23 surrounds the frame member 21 and bears against the adjacent portion of inner liner 3. The frame and associated humigrid are secured to the liner wall by means of a pair of grommets 24 (one of which is illustrated in Fig. 3) extending through suitable apertures provided in said wall. As also appears in Fig. 3, the contact elements 20 are embedded in the grommets, each of said elements being provided with a spring-contact portion 25 and a suitable electrical conductor 26.

It will be appreciated that the mounting structure above described permits ready removal of the humigrid for cleaning or replacement purposes.

Operation of the device will be understood by reference to Fig. 5, in which the so-called moist-cold compartment, the humidity of which is to be controlled, is indicated at 4.

It should be borne in mind that the presence of moisture in the compartment 4, above a predetermined value of percent relative humidity, will result in deposition of sufficient moisture upon the humigrid 16, to render it relatively conductive, thereby energizing a suitable relay-operated switch and initiating operation of the blower motor 9. The blower will maintain the humidity reducing cycle until the moisture upon the humigrid has been somewhat decreased, as the result of a reduction in the relative humidity to a predetermined value. Due to the large volume of compartment 4 as compared with the dehumidifying zone, and also as a result of the relatively slow circulation of air through said compartment 4, the blower 9 will generally operate for some little time before the box humidity has been sufficiently reduced to decrease the moisture upon the humigrid below the predetermined control point. Thus the blower cycles do not occur with objectionable frequency.

To the foregoing general ends, the invention employs a grid controlled gas relay tube 27, such, for example, as type 2050. The heater 28 of tube 27 is energized by connection across secondary winding 29 of a transformer 30, which transformer is connected to a suitable power line at terminals 31 and 32. The transformer 30 also includes a secondary winding 33 adapted to energize the anode-cathode circuit of tube 27 by virtue of connecting anode 34 to the high potential end of winding 33 through the coil 35. The grid 37 of relay tube 27 is connected across secondary winding 29. This connection is through variable resistor 38, the grid-to-cathode circuit being shunted by resistor 39. The humigrid 16 is connected across the terminals of resistor 39. It will be apparent that contacts 40 and 41 of relay 36 will close upon the passage of plate current through relay coil 35, thus applying to blower motor 9, the power available across terminals 42 and 43.

The operation of the gas type relay is as follows: The connection to the grid circuit from winding 29 is so related to the plate circuit connection from winding 33 that the potential of the grid 37 is negative, with respect to the cathode, when the potential of the plate is positive with respect to the cathode.

It will be noted that the humigrid and the resistors 38 and 39 constitute a voltage divider across the grid voltage source 29. This divider may be regarded as comprising two impedances in series, the first impedance, $Z_1$, being the variable resistor 38, while the second impedance, $Z_2$, is made up of the resistor 39 and the humigrid 16 in parallel. It will also be noted that only a portion of the voltage $E_1$ (the voltage supplied by the winding 29) is applied to the grid 37. This is the portion which appears across the impedance $Z_2$. Specifically, the voltage $E_g$ applied to the grid 37 may be determined from the equation $$E_g = \frac{Z_2}{Z_2 + Z_1} \cdot E_1$$

In general, when the humigrid is operated over a high resistance range, the resistors 38 and 39 associated with the humigrid should also be of relatively high resistance, e. g., of the order of magnitude of the humigrid resistance. The reasons for this will be made more apparent hereinafter.

As the moisture on the humigrid 16 increases, due to an increase in the compartment humidity, the resistance between the terminals of the humigrid decreases, reducing the magnitude of the impedance $Z_2$, and thus, as will be seen from the equation, decreasing the voltage $E_g$ applied to the grid 37 of tube 27. When the voltage $E_g$ reaches the firing potential of the tube 27, normal plate current will begin to flow and the relay 36 will be energized. Such energization actuates the blower motor and effects de-humidification as above described.

When the humidity has been reduced to a point where the moisture on the humigrid has decreased below that necessary to maintain the tube 27 in its conducting condition, the relay will return to its open position and the dehumidifying cycle is terminated.

From the foregoing, it is evident that the circuit is operative automatically to energize the blower motor 9 through relay 35, during such times as the humigrid 16 is relatively conductive, and to de-energize the blower circuit when the humidity has been reduced sufficiently to render the humigrid relatively non-conductive.

Considerable control flexibility is possible. Control of the relative humidity in the compartment 4 may, for example, be varied between maximum values ranging from just below 100% to in the neighborhood of 80%, or lower. As illustrated in Fig. 1, a control knob is provided at 44 which may be so connected (in any convenient manner) as to vary the effective resistance of resistor 38, which variation will be effective to provide the desired maximum relative humidity, provided the temperature of the humigrid 16 is maintained at a substantially constant value. The effect upon the circuit of variations in the value of resistor 38, will be considered presently.

Figure 4:
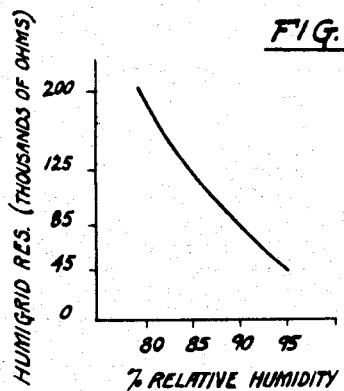
Fig. 4 is a graphic representation illustrating the resistance characteristic of the element shown in Fig. 2.

Reference may now be had to Fig. 4 which illustrates a graph of humigrid resistance plotted against average relative humidity of the compartment air, the humigrid being maintained at approximately 38° F., the selected wall temperature of the inner liner.

As is indicated in the graph, the humigrid resistance at relative humidities of the order of 80% to 95% is in the nature of many thousands of ohms. However, the variation in resistance is substantial, and consequently if the humigrid is suitably employed in a voltage operated relay circuit, said humigrid may be utilized to provide substantial and useful voltage variations at relatively low box humidities. A circuit for utilizing this high resistance variation effect of the humigrid has already been described with reference to Fig. 5. It will be noted that when the humigrid is employed in this manner, i. e., in combination with a relatively low voltage source $E_1$ and associated resistances of high value, the current flowing through the humigrid is very small (of the order of microamperes rather than milliamperes), thus avoiding the undesired premature loss of the moisture film on the humigrid as a result of electrolysis, or of evaporation due to heating produced by the I²R loss occasioned by the current flowing through the resistance of the humigrid.

I have found that where the humigrid is employed as an element in a current operated system, it is necessary to accumulate a considerable amount of moisture thereon before a sufficient current flow is obtained to energize current-operated devices. Moreover, such amounts of moisture are accumulated only at very high percentages of box humidity—of the order of 98% to 100%. In accordance with the present invention on the other hand, wherein the humigrid is operated as an element in a voltage-operated system, useful films of moisture condense on the humigrid at much lower percentages of relative humidity, and consequently it is possible to maintain the humidity of the box at values well below 95%. For example, with box humidities of the order of 80% useful variations of humigrid resistance are obtained with moisture films which are so thin as to be invisible or almost invisible.

In one embodiment of the invention, which has operated very satisfactorily to maintain the maximum compartment humidity at any selected point in the range indicated on the graph appearing in Fig. 4, the resistance 39 had a value of 100,000 ohms and by varying the value of resistor 38 between 46,000 and 100,000 ohms, it was possible to control the relative humidity of the compartment 4 between levels of 95% and 80%. In another embodiment in which the resistor 39 had a value of 25,000 ohms, it was possible to control the relative humidity of the box between the same levels by varying the resistor 38 from 24,000 to 33,000 ohms. The value of the resistor 38, as set forth above, is readily varied by adjustment of the control knob 44. Under these operating conditions a value of 6 volts was utilized for $E_1$, both $E_L$ and $E_2$ being 115 volts.

The general effect of varying the value of the shunt resistor 39 is to change the effective sensitivity of the humigrid 16. As the magnitude of the shunt resistance 39 is reduced, the voltage varying effect of the humigrid is likewise reduced, as is also the sensitivity of the system. The effect of increasing the resistance of resistor 38 is to decrease the amount of moisture required on the humigrid before the firing level of the tube 27 is reached. Thus when it is desired to maintain a relatively low humidity in the compartment 4 a relatively high value of resistor 38 should be employed.

In the preferred embodiment of the present invention the humigrid is maintained at a temperature sufficiently lower than the average temperature of the air within the enclosure, to ensure that said grid will be at or below the dew-point temperature of the air in contact therewith, whenever an undesirably high average humidity condition exists within said enclosure. This temperature relation provides an anticipatory effect serving to broaden the range of maximum box humidities which may be selectively maintained.

While the foregoing is preferred, it appears that humidity variations may occasion substantial changes of resistance in such a humigrid, even when the temperature thereof has not been reduced below the dew-point temperature of the atmosphere in contact therewith, and such operation may be utilized if desired. The differential between the humigrid temperature and the average air temperature, determines the range in which the changes in humigrid resistance will fall, the resistance values increasing with decreases in the aforesaid temperature differential. Nevertheless it will be clear that an increase in the general range in which the humigrid resistance values fall, may be compensated for by increasing the area of said humigrid.

Moreover, it is evident that the apparatus of the invention may readily be utilized to effect increases in the moisture content of gases, or atmospheres. However, it will be understood that the invention is susceptible of such changes and modifications as may come within the scope of the appended claims.

I claim:

1. In a refrigerator, apparatus for controlling the percent relative humidity within a compartment of said refrigerator, said apparatus comprising; an element in contact with moisture-laden air of said compartment and having an electrical resistance characteristic variable in accordance with the amount of moisture present thereon, means for maintaining said element at a temperature lower than the average temperature of the air within said compartment, means adapted to vary the moisture content of said air, and means operable to initiate operation of said moisture-varying means when the resistance of said element has attained a predetermined value.

2. In a refrigerator, apparatus for controlling the percent relative humidity within a compartment of said refrigerator, said apparatus comprising; an element in contact with moisture-laden air of said compartment and having an electrical resistance characteristic variable in accordance with the amount of moisture present thereon, means for maintaining said element at a temperature lower than the average temperature of the air within said compartment, means adapted to reduce the moisture content of said air, and means operable to initiate the operation of said moisture-reducing means when the resistance of said element has attained a predetermined value.

3. In a refrigerator, apparatus for controlling the percent relative humidity of air within a compartment thereof, said apparatus comprising; an element in contact with moisture-laden air of said compartment and having an electrical resistance characteristic variable in accordance with the amount of moisture present thereon, means for maintaining said element at a temperature sufficiently lower than the average temperature of the air within said compartment to ensure that said element will be substantially at the dew-point temperature of the air in contact therewith whenever an undesirably high average humidity condition exists within said compartment, means adapted to reduce the moisture content of said air, and means operable to initiate operation of said moisture-reducing means when the resistance of said element has attained a value in correspondence to a predetermined quantity of moisture thereon.

4. In a refrigerator, a storage compartment, cooling means arranged in high heat exchange relation with the air of said compartment whereby to cool said air, and apparatus for controlling the percent relative humidity within the compartment, said apparatus comprising; an element in contact with moisture laden air of said compartment and having an electrical resistance characteristic variable in accordance with the amount of moisture present thereon, said element being mounted in relatively high heat exchange relation with the compartment cooling means, means adapted to vary the moisture content of said air, and means operable to initiate operation of said moisture-varying means when the resistance of said element has attained a predetermined value.

WILSON P. BOOTHROYD.

REFERENCES CITED

The following references are of record in the file of this patent:

UNITED STATES PATENTS

| Number | Name | Date |
| --- | --- | --- |
| 1,960,658 | Brace | May 29, 1934 |
| 2,064,651 | Fiene | Dec. 15, 1936 |
| 2,234,858 | Brown et al. | Mar. 11, 1941 |
| 2,346,837 | Grooms | Apr. 18, 1944 |
| 2,015,125 | Polin | Sept. 24, 1935 |